United States Patent [19]

Andersen et al.

[11] Patent Number: 4,616,341
[45] Date of Patent: Oct. 7, 1986

[54] DIRECTORY MEMORY SYSTEM HAVING SIMULTANEOUS WRITE AND COMPARISON DATA BYPASS CAPABILITIES

[75] Inventors: John E. Andersen; Joseph A. Petrosky, both of LaGrangeville; Benedicto U. Messina, Poughkeepsie; William D. Silkman, Hopewell Junction, all of N.Y.

[73] Assignee: International Business Machines Corporation, Armonk, N.Y.

[21] Appl. No.: 509,674

[22] Filed: Jun. 30, 1983

[51] Int. Cl.$^4$ ............................................. G11C 7/00
[52] U.S. Cl. .................................... 365/189; 365/230; 364/200
[58] Field of Search ................ 365/189, 230, 49, 201; 364/200 MS File, 900 MS File; 371/25

[56] References Cited

U.S. PATENT DOCUMENTS

| | | | |
|---|---|---|---|
| 3,471,838 | 10/1969 | Ricketts, Jr. et al. | 365/194 |
| 4,020,470 | 4/1977 | Drimak et al. | 364/200 |
| 4,095,278 | 6/1978 | Kihara | 364/900 |
| 4,104,719 | 8/1978 | Chu et al. | 365/230 |
| 4,120,048 | 10/1978 | Fuhrman | 365/230 |
| 4,171,538 | 10/1979 | Sheller | 364/900 |
| 4,219,883 | 8/1980 | Kobayashi et al. | 365/189 |
| 4,424,561 | 1/1984 | Stanley et al. | 364/200 |

OTHER PUBLICATIONS

Dussault et al, "Read Write Scheme for Bipolar Random-Access Memories Using Schottky Coupled Cells", IBM Tech. Disc. Bull., vol. 24, No. 11A, Apr. '82, pp. 5632-5633.

Primary Examiner—Terrell W. Fears
Assistant Examiner—Glenn A. Gossage
Attorney, Agent, or Firm—Sughrue, Mion, Zinn, Macpeak, and Seas

[57] ABSTRACT

A directory memory system having simultaneous writing and bypass capabilities. A data output bit from a respective memory cell of a memory array is applied to a control input of a first differential amplifier, while comparison input data is applied to inputs of a second differential amplifier. The outputs of corresponding transistors of the two differential amplifiers are connected together. Current switch transistors, operated in response to a bypass select signal, supply current only to one or the other of the two differential amplifiers. The differential output signal produced across the commonly connected outputs of the two differential amplifier circuits is buffered and amplified with a push-pull output circuit.

7 Claims, 2 Drawing Figures

DIRECTORY MEMORY SYSTEM HAVING SIMULTANEOUS WRITE AND COMPARISON DATA BYPASS CAPABILITIES

BACKGROUND OF THE INVENTION

The invention pertains to a directory memory system, particularly, to a directory memory system which has the capability of simultaneously writing data into a memory block of the memory system and bypassing comparison input data onto an output data bus of the memory system.

Directory memory systems, especially directory memory systems fabricated upon a single integrated circuit chip, have recently found increasing use in high-speed computer systems. One example of such a directory memory system is disclosed in U.S. Pat. No. 4,219,883 to Kobayashi et al. Such devices can be used advantageously to perform a number of different functions within the computer system. One example is in a cache memory, which is a small, highspeed memory positioned between a main, slower memory and a central processor. The cache memory stores the most frequently used data retrieved by the processor from the main memory for rapid access by the processor. Another application of a directory memory chip is in a "trace" system in which a predetermined amount of the data most recently used by the processor is stored for examination to locate possible faults within the computer system. Many other applications of course are possible.

A directory memory chip should be capable of performing the following functions:

(1) writing input data into a memory block for temporary storage therein;

(2) reading data from the memory block onto an output data bus;

(3) comparing designated portions of the data stored in the memory block with received comparison data values; and (4) bypassing the comparison data onto the output data bus.

Although prior art directory memory systems may have been capable of performing such functions, nevertheless, they suffered from a serious drawback in that none were capable of performing any of the above-mentioned functions simultaneously, specifically, functions which would not interfere with one another. More particularly, none were capable of performing the writing and bypassing functions simultaneously because the prior art directory memory systems generally caused the data present on the output lines of the output data bus to be invalid during data writing operations. This is disadvantageous in that memory or control cycles are wasted waiting for a writing operation to be completed before a bypassing operation can be commenced. The overall processing speed of a computer system employing one or more directory memory systems or chips could be significantly increased if the writing and bypassing operations could be performed simultaneously.

Accordingly, it is a primary object of the present invention to provide a directory memory system in which writing and bypassing operations can be performed simultaneously without interference with each other.

SUMMARY OF THE INVENTION

These, as well as other objects of the invention, are met by a directory memory system having simultaneous writing and bypass capabilities, the directory memory system including a memory block, means for reading data from the memory block, and means for coupling a selected one of a set of data bits on an output of the reading means and a set of data bits of an input comparison data word to an output data bus. For each bit of the output data bus, the coupling means includes a first differential amplifier controlled by a respective bit of the output of the reading means, a second differential amplifier controlled by a respective bit of the comparison data, with the first and second differential amplifiers each having complementary outputs coupled to a single set of first and second nodes, a current source, first and second current switch transistors for selectively coupling the current source to a selected one of the first and second differential transistors for supplying operating current thereto, and means for activating a selected one of the first and second current switch transistors for correspondingly activating one of the first and second differential amplifiers. A push-pull amplifier stage may be provided for amplifying and buffering a signal produced differentially across the first and second nodes, with the output of the push-pull amplifier stage being applied to the respective bit line of the output data bus. The activating means may itself be a differential amplifier, an input of which receives a bypass control signal. Preferably, emitter-follower buffer transistors are connected between the outputs of this third differential amplifier and bases of the first and second current switch transistors.

DESCRIPTION OF THE PREFERRED EMBODIMENTS

Figure 1:
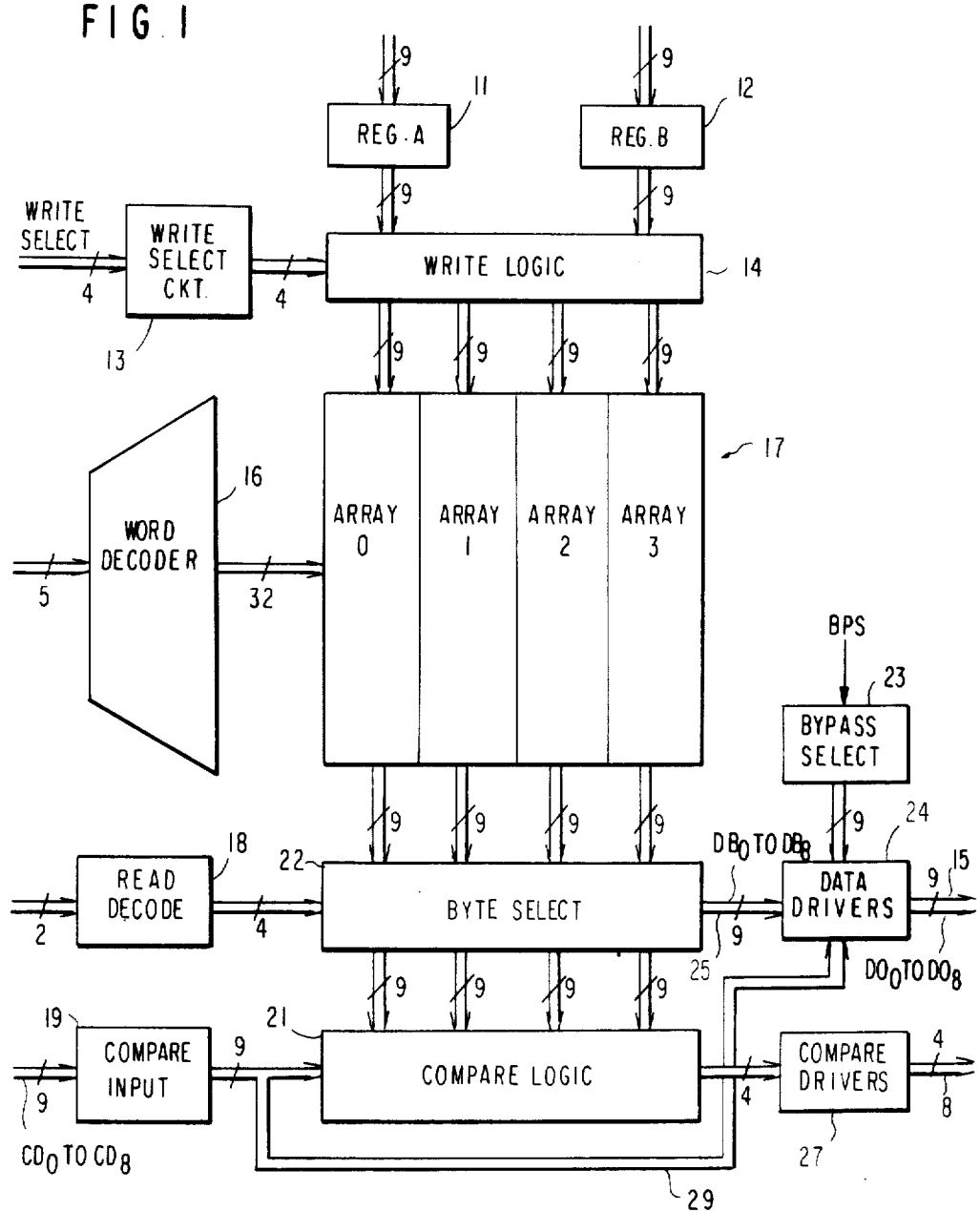
FIG. 1 is a block diagram of a directory memory system in which the invention may be used to advantage.

Referring now to FIG. 1 of the drawings, a directory memory system in which the invention may be used to advantage is shown in block diagram form. The directory system includes registers 11 and 12 (registers A and B), each of which receives a nine-bit input data byte. The input data stored in the registers 11 and 12 is routed to selected ones of the arrays 0 to 3 of a memory block 17 under the control of a write logic circuit (demultiplexer) 14 and write select circuit 13. In the example under discussion, it is assumed that each array 0 to 3 has a nine-bit input and can store 32 nine-bit bytes. The byte location of each byte written into the memory block 17 from the write logic circuit 14 is determined by a word decoder 16. Specifically, the word decoder 16 activates one of 32 output lines, as determined by a five-bit input code, to thereby address a corresponding byte location of each of the arrays 0 to 3.

Nine-bit outputs from each of the arrays 0 to 3 are fed to a byte select circuit (multiplexer) 22 and to a compare logic circuit 21. The control inputs to the byte select circuit 22 are supplied by a read decode circuit 18. Upon reading data from the memory block 17, the read decode circuit 18 selects the output of one of the arrays 0 to 3 and couples it via a data bus 25 and data drivers 24 to an output bus 15. The compare logic 21 compares the nine-bit comparison data provided by the compare input circuit 19 on a bus 19 with each of the outputs of each of the arrays 0 to 3, and produces four single-bit output comparison signals to indicate the result of respective ones of the four comparisons. These output comparison signals are buffered by compare drivers 27 and then applied to a comparison output bus 8. A bypass select circuit 23 causes the data drivers 24 to couple to the output bus 15 either the byte of data present on the data bus 25 or the comparison data on the comparison bus 29.

The invention pertains most directly to the structures of the comparison input circuit 19, the bypass select circuit 23 and the data drivers 24. These will now be discussed in detail with reference to the detailed circuit diagram of FIG. 2.

Figure 2:
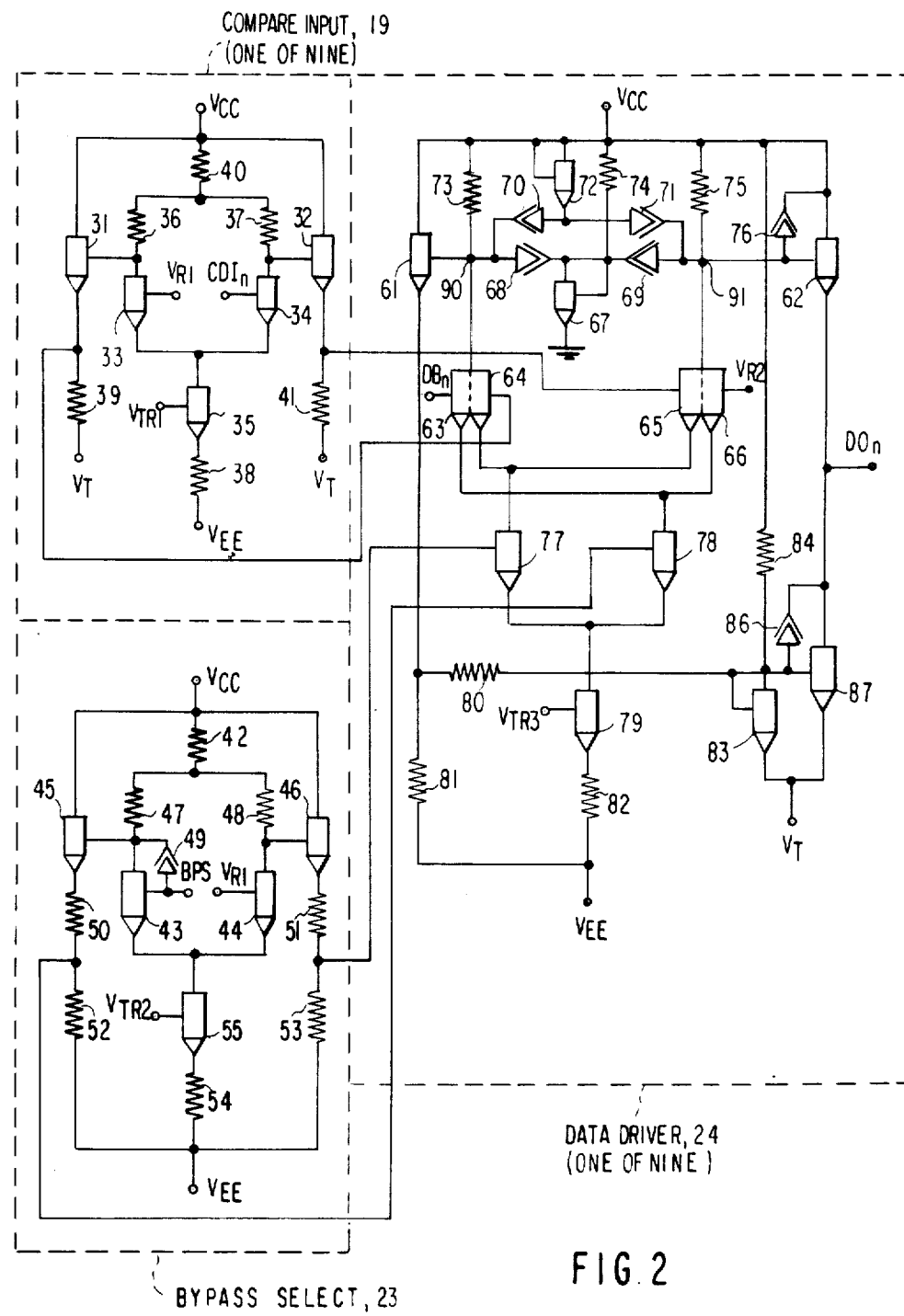
FIG. 2 is a detailed circuit diagram of a compare input circuit, bypass select circuit and data driver circuit of FIG. 1 constructed in accordance with the invention.

In FIG. 2, one unit of each of the compare input circuit 19 and data driver circuit 24 are shown. However, one unit of each of these should be provided for each bit of a nine-bit byte. All nine units of the circuits are, of course, identical to those shown in FIG. 2. One bypass select circuit 23 can serve nine compare input and data driver circuits.

The compare input circuit unit includes transistors 33, 34 and 35 connected in a differential amplifier configuration. The transistor 35 serves as the current source of the differential amplifier, while the transistors 33 and 34 serve as the differential input devices. The emitter of the transistor 35 is coupled through a resistor 38 to a negative power supply potential $V_{EE}$, while the collectors of the transistors 33 and 34 are applied through resistors 36, 37 and 40 to a positive power supply potential $V_{CC}$. Transistors 31 and 32, which are connected in an emitter-follower configuration, provide the outputs from the compare input circuit unit. The collectors of both of the transistors 31 and 32 are connected directly to the positive power supply potential $V_{CC}$, their bases to collectors of corresponding transistors 33 and 34, and their emitters through respective resistors 39 and 41 to a negative biasing potential $V_T$. One bit line $CDI_n$ of the input comparison data is applied to the base of the transistor 34, while the base of the transistor 33 receives a reference voltage $VR_1$. If desired, ground may be used as the reference voltage.

The bypass select circuit unit also includes input transistors connected in a differential amplifier configuration, specifically, transistors 43, 44 and 55. The emitter of the current source transistor 55 is connected through a resistor 54 to the negative power supply potential $V_{EE}$, and the collectors of the transistors 43 and 44 are connected through resistors 42, 47 and 48 to the positive power supply potential $V_{CC}$. A Schottky-barrier diode is connected between the collector and base of the transistor 43 to provide clamping in a well-known manner. The reference voltage $VR_1$ is applied to the base of the transistor 44, while the base of the transistor 43 receives a bypass control signal BPS. BPS is in the UP (positive) state when a bypass operation is to be performed and in the DOWN (negative) state otherwise. Emitter-follower configured transistors 45 and 46 buffer the outputs from the transistors 43 and 44. The collectors of both the transistors 45 and 46 are connected to $V_{CC}$, while their emitters are coupled through voltage-divider resistor circuits 50, 52 and 51, 53 respectively, to $V_{EE}$. The voltage division points of the two voltage divider circuits provide complemented and uncomplemented outputs from the bypass select circuit unit.

The data driver circuit unit includes transistor pairs 63, 64 and 65, 66, with the collectors of each pair being connected together, at nodes 90 and 91, respectively, and thence through respective resistors 73 and 75 to $V_{CC}$. A clamping network composed of transistors 67 and 72 and Schottky-barrier diodes 68-71 clamps the collector voltages of the transistor pairs 63, 64 and 65, 66 at upper and lower levels. A transistor 79 serves as a current source for two differential amplifier circuits, one formed by the transistors 63 and 66, and the other by the transistors 64 and 65. A resistor 82 is connected between the emitter of the transistor 79 and $V_{EE}$ and a control voltage $V_{TR3}$ is applied to its base. Current switch transistors 77 and 78 and cascade connected between the commonly connected emitters of each differential amplifier circuit and the collector of the current source transistor 79. The bases of the current switch transistors 77 and 78 are controlled by the complementary outputs of the bypass select circuit unit.

The inputs to the differential amplifier formed by the transistors 63 and 66 are a data bit $DB_n$ from the data bus 25 and a reference voltage $V_{R2}$, while the inputs to the bases of the transistors 64 and 65 of the second differential amplifier circuit are provided by the complementary outputs of the compare input circuit unit.

The output $DO_n$ from the data driver circuit unit is produced by a push-pull arrangement which includes transistors 61, 62, 83 and 87 and resistors 80, 81 and 84. More specifically, the upper push-pull transistor 62 receives an input directly from the commonly connected collectors of the transistor pair 65, 66, while the input to the lower push-pull output transistor 87 is provided from the commonly connected collectors of the transistor pair 63, 64 through a noninverting emitter-follower circuit including transistor 61. Schottky-barrier diodes 76 and 86 are connected between the collectors and bases of the transistors 62 and 87, and a transistor 83, connected as a diode and biased through the resistor 84, is used for biasing the transistor 87.

In operation, in the "array" mode where it is desired to allow the data bit $DB_n$ control the state of the respective output data bit $DO_n$ on the output bus 15, the signal BPS is held in the DOWN state. This turns off the transistor 43 and turns on the transistor 45, thereby causing the voltage at the junction point between the resistors 50 and 52 to be more positive than the voltage at the junction point between the resistors 51 and 53. Accordingly, the transistor 77 of the data driver circuit 24 is turned off while the transistor 78 is turned on. This in turn causes the transistor 79 to be connected as a current source transistor to the differential amplifier formed by the transistors 63 and 66. Accordingly, the voltages at the nodes 90 and 91 are controlled by the state of the data bit $DB_n$, that is, by the voltage of the data bit signal $DB_n$ relative to the reference voltage $VR_2$. If, for instance, the data bit $DB_n$ is in the UP state, the node 91 will be more positive than the node 90. In that case, the transistor 62 is turned on and the transistor 87 turned off. Hence, the output bit $DO_n$ will then be at the UP level. If $DB_n$ is in the DOWN state, the node 90 will be at a higher voltage than the node 91, and hence the transistor 62 will be turned off and the transistor 87 turned on, setting $DO_n$ in the DOWN logic state.

On the other hand, in the bypass mode, the transistor 43 will be turned on by the signal BPS being in the UP state. In that case, the transistor 46 of the bypass select circuit 23 will be turned on and the transistor 45 turned off. Thus, the voltage at the junction between the resistors 51 and 53 will be more positive than the voltage at the junction between the resistors 50 and 52. This turns on the transistor 77 and turns off the transistor 78 of the data driver circuit 24, thereby connecting the transistor 79 as a current source to the differential amplifier formed by the transistors 64 and 65. The complementary outputs from the compare input circuit 19, and accordingly, the state of the bit $CDI_n$, control the voltages at the nodes 90 and 91. Because the transistor 78 is turned off, the differential amplifier formed by the transistors 63 and 66 and which is controlled by the data bit $DB_n$ will have no effect on the voltages at the nodes 90 and 91. Thus, it can be easily be appreciated that, with the invention, a bypass operation can be performed simultaneously with a writing operation because the voltages of the data bit signals $DB_0$ to $DB_8$ from the byte select circuit 22 will have no effect on the output data bits during the bypass operation.

This completes the description of the preferred embodiments of the invention. Although preferred embodiments have been described, it is believed that numerous modifications and alterations thereto would be apparent to one having ordinary skill in the art without departing from the spirit and scope of the invention.

We claim:

1. A directory memory system having simultaneous writing and comparison data bypass capabilities, comprising:

a memory block arranged in a plurality of arrays;

byte select means responsive to each said array, for selectively coupling the output of one said arrays to a byte select output;

compare logic receiving said outputs of each of said arrays and comparison data, for comparing said array outputs with said comparison data and for directing a comparison output to a first output data bus;

means for coupling a selected one of (a) a data byte on said byte select output or (b) said comparison data, to a second output data bus; and selecting means for supplying a selection signal to said coupling means.

2. The directory memory system of claim 1, wherein said coupling means comprises, for each bit of said output data bus:

a first differential amplifier controlled by a respective bit of said output of said reading means;

a second differential amplifier controlled by a respective bit of said comparison data, said first and second differential amplifiers each having complementary outputs coupled to a single set of first and second nodes;

a current source;

first and second current switch transistors for selectively coupling said current source to one of said first and second differential amplifiers for supplying operating current thereto;

and wherein said selecting means comprises means for activating a selected one of said first and second current switch transistors for correspondingly activating one of said first and second differential amplifiers.

3. The directory memory system of claim 2, further comprising a push-pull amplifier stage for amplifying and buffering a signal produced differentially across said first and second nodes, an output of said push-pull amplifier stage being applied to a corresponding bit line of said output data bus.

4. The directory memory system of claim 3, wherein said means for activating said selected one of said first and second differential amplifiers comprises a third differential amplifier having an input receiving a bypass control signal; and first and second emitter-follower buffer transistors electrically connected to outputs of said third differential amplifier and to bases of respective ones of said first and second current switch transistors.

5. The directory memory system of claim 4, wherein a single one of said selecting means is provided for a plurality of each of said first and second differential amplifiers.

6. The directory memory system of claim 4, further comprising first and second voltage divider circuits coupled to emitters of said first and second emitter-follower buffer transistors, respectively, voltage division points of said first and second voltage divider circuits being connected to said bases of said first and second current switch transistors, respectively.

7. The directory memory system of claim 6, further comprising a fourth differential amplifier circuit for supplying differential control signals to said second differential amplifier in accordance with said respective bit of said comparison data.

* * * * *